United States Patent Office  3,210,015
Patented Oct. 5, 1965

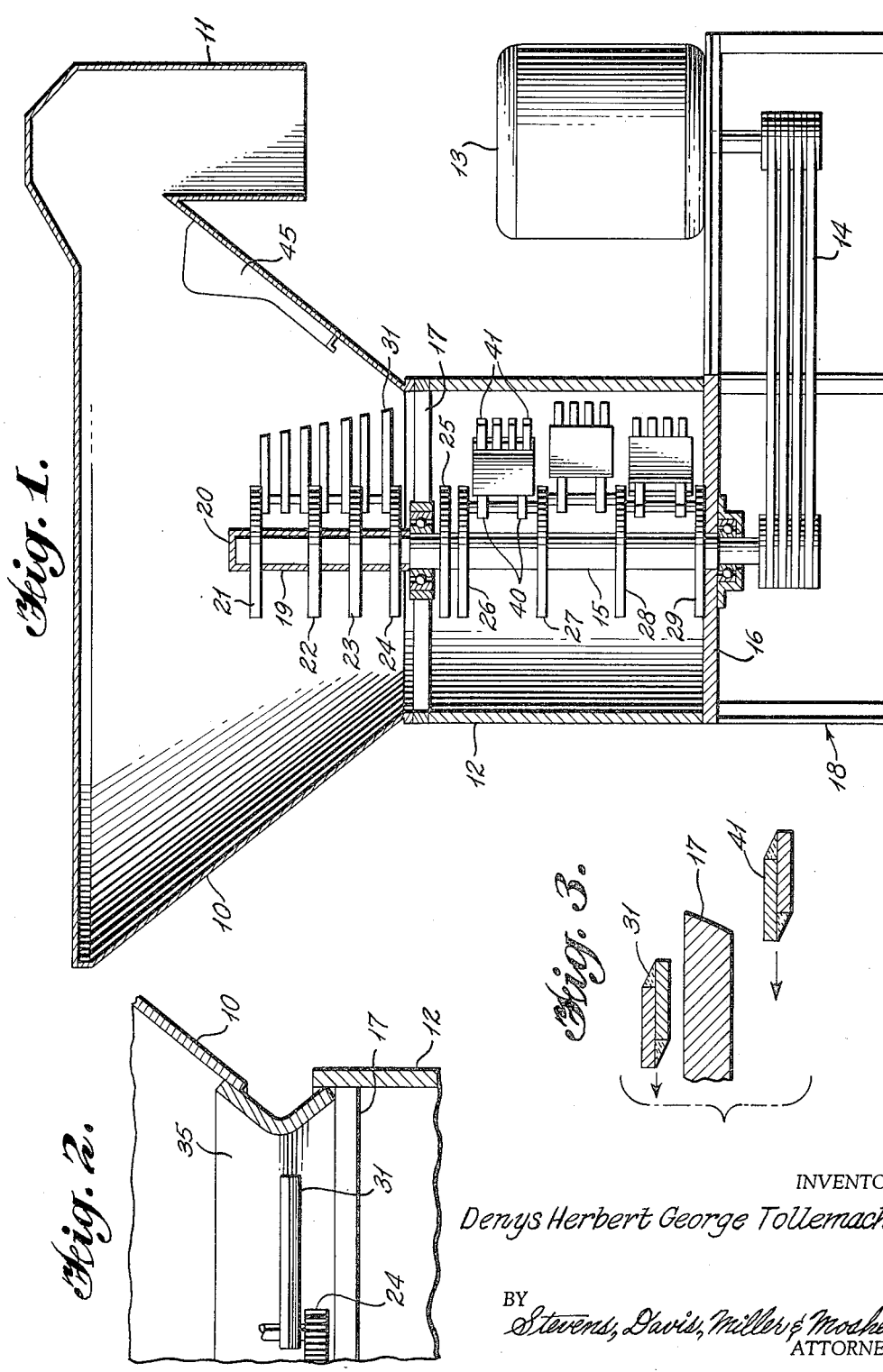

3,210,015
BALLISTIC SEPARATOR
Denys Herbert George Tollemache, 6 Bedford St.,
London, W.C. 1, England
Filed June 11, 1963, Ser. No. 286,979
10 Claims. (Cl. 241—56)

The present invention relates to ballistic separators and also includes pulverisers in combination with such separators.

A known ballistic separator comprises a paddle rotatable about a horizontal axis at the lower end of a vertically extending high tower the material to be separated being introduced from above the paddle so that dust, grit and material of small particle size and which has little inherent elasticity falls under gravity past the blades of the paddle, while articles such as cans, pieces of metal and rubber etc., bounce from the revolving blades and are thrown out of the top of the container. In such separators in order that only the heavier and the more elastic articles should be rejected, the tower has to be extremely tall.

It is an object of this invention to provide an improved ballistic separator.

According to the present invention there is provided a ballistic separator comprising a container, flails mounted for rotation in said container on a shaft about a substantially vertical axis and means for causing a downdraft of air through said container, the arrangement being such that, when material is fed onto said container with said flails rotating, heavy and resilient objects which are not easily disintegrated on impact will be propelled upwardly, around said container and out therefrom whilst lighter and less resilient material, will be pulled downwardly against said flail by said downdraft of air.

In the separator according to this invention, the heavier and more bouncy non-frangible articles introduced into the separator only are thrown outwardly therefrom and upwardly in the container so that they are rejected from the top of the container, while finer material and articles of a lighter and less resilient nature are drawn downwardly both by gravity and by the downward stream of air, so that the separator can be made in a very compact form.

Preferably the means for drawing air downwardly comprise surfaces on said flails adapted to cause downward flow of air on rotation of said flails, i.e. said flails are arranged to be the blades of an axial flow air pump.

According to another aspect of the invention the separator is mounted above a ballistic pulveriser to receive material drawn downwardly from the container of the separator. The pulveriser may include hammer mill units mounted on the same shaft as the flails and contained in a substantially cylindrical portion of the container and material passing through said mill units is pulverised between the mill units and the surrounding cylindrical container.

In order that the invention may more readily be understood the following description is given of one preferred embodiment of pulveriser according to the invention reference being made to the accompanying drawings in which:

FIGURE 1 is a schematic elevational view of the preferred embodiment of separator according to the invention;

FIGURE 2 is a fragmentary view of a portion of the separator illustrated in FIGURE 1; and FIGURE 3 is a cross section through the lowermost flail, spider and uppermost hammer unit.

Referring now to the drawings there is shown a container or hopper 10 having a substantially conical bottom wall defining deflector means, the container 10 having secured on one side of the top thereof a reject chute 11. At the lower end of the hopper 10 is secured a substantially cylindrical portion 12 mounted on a base frame 18. Also mounted on the base frame is a 70 horse-power electric motor 13 driving, by means of V-belts 14, a vertically disposed shaft or spindle 15 mounted in the cylindrical portion 12 by means of bearings in a lower plate 16 and an open spider 17 the latter being placed at the junction of the cylindrical portion 12 and the conical container 10.

A square sleeve 19 is mounted surrounding the upper part of spindle 15 and acts as a spacer for four discs 21 to 24 and is held down by cap 20 on to the spindle 15. Further discs 25 to 29 are spaced apart on the shaft below spider 17. Between adjacent pairs of discs above the upper spider 17 a number of flails are mounted, these flails being either secured to the associated disc or movable relatively thereto on a suitable pivot axis. As can be seen in FIGURE 3 the cross section of the lowermost flail 31 is that of two adjacent rectangles positioned in overlapping relation with lap-welds securing them together. These lowermost flails thus have a suitable aerodynamic shape so that, upon rotation thereof on the spindle they cause a downdraft of air through the hopper 10. The shape of the spider is also such as to increase the downdraft effect. In the drawings only one set of flails has been illustrated between each set of adjacent discs 21 to 24. However, the adjacent discs may support a plurality of sets of flails. A convenient number would be four sets. Similarly below the spider 17 and mounted between adjacent discs 26 to 29 are three sets of hammer units each set having three hammer units. Each hammer unit consists of a swing bar 40 pivotably mounted between adjacent discs and hammers 41 pivotably mounted with suitable spaces relative to the swing bars 40.

Surrounding the hammer units between the upper spider 17 and the bottom plate 16 is a grid (not shown) material being pulverised between this grid and the hammers of the hammer units. The hammer units are positioned relative to one another so as to cause a downdraft in the cylindrical portion 12. Furthermore blades may be provided with a suitable contouring to enhance this downdraft effect.

As seen in FIGURE 2 the portion of hopper 10 which joins the cylindrical portion 12 may be covered with a suitably shaped removable plate 35 of toughened material since this portion of the container receives the greatest impact from materials thrown out by the flails. The upper edge of this plate projects from the wall of the hopper 10 and acts to deflect material sliding down the hopper wall inwardly on to the flails. This enables a fairly wide clearance to be provided between the flails and the plate so that material may pass readily to the lower part of the apparatus. The lower part of this plate may be flared outwardly to assist such passage of material. Furthermore the wall of the hopper may be suitably contoured to ensure that material to be rejected is directed round the inner wall of hopper 10 in to chute 11. Advantageously a baffle 45 or a series of baffles suitably placed around the hopper 10 to break up any tendency of the material to assume a circular flow pattern in the same direction as that in which the flails rotate.

In operation of the ballistic separator pulveriser described above, waste material is fed into hopper 10 via a suitable input hopper at the top of hopper 10 and falls under the action of gravity onto the rotating flails. The heavier and more bouncy non-frangible articles in the material are thrown by the flails upwardly round the divergent walls of the hopper 10 which act to deflect said articles upwardly so that they are thus either thrown out of the container or hopper 10 into the reject chute 11 or fall down against the flails with greater force so that they are then thrown into the chute 11 by the flails. The lighter material such as paper, dust, etc., which is not so bouncy, is drawn by gravity and under the action of the downward airstream through the flails and past the spider 17 into the cylindrical portion 12. The light material is then ground between the hammers 41 and the grid. The pulverised material then can be removed from the cylindrical portion in any suitable manner, e.g. through an outlet (not shown) in the side of portion 12.

While the above described embodiment has been shown as including the cylindrical portion provided with hammer units it is to be understood that this invention includes within its scope a ballistic separator in which no hammer units are provided, those discs below the spider 17 being provided with suitable blades for causing a down flow of air through the container or hopper 10. Thus, the material passing to the bottom of the separator may be removed to another apparatus for maceration, for example after being subjected to a fermentation operation. Similarly the motor in such a construction need not be placed as in the described embodiment but may be situated either above or below the spindle of the flails.

The separator of this invention is so compact that it may readily be mounted on a conventional trailer or other vehicle to provide a mobile separator. A conveyor belt leading upwardly to the top of the input hopper may be provided for feeding the material to the apparatus.

I claim:

1. A ballistic separator comprising a container, a shaft rotatably mounted in said container about a substantially vertical axis, means for rotating said shaft about said axis, rigid flails mounted for rotation with said shaft about said axis effective to propel heavy and resilient objects outwardly, deflector means effective to deflect said objects upwardly out of said container and means for causing a downdraft through said container effective to pull lighter and less resilient material downwardly against the action of said flails.

2. A ballistic separator comprising an open topped conical container, a shaft rotatably mounted in said container about a substantially vertical axis, means for rotating said shaft about said axis, rigid flails mounted for rotation with said shaft about said axis effective to propel heavy and resilient objects outwardly against said conical container effective to deflect said objects upwardly out of said container and means for causing a downdraft through said container effective to pull lighter and less resilient material downwardly against the action of said flails.

3. A ballistic separator according to claim 2 wherein said means for producing a downdraft are mounted on the said shaft.

4. The separator specified in claim 2 and including baffle means in said container effective to prevent material assuming a rotary pattern.

5. A ballistic separator comprising a container, a shaft rotatably mounted in said container about a substantially vertical axis, means for rotating said shaft about said axis, rigid flails mounted for rotation with said shaft about said axis effective to propel heavy and resilient objects outwardly, deflector means effective to deflect said objects upwardly out of said container, at least some of said flails being shaped to cause a downdraft through said container effective to pull lighter and less resilient material downwardly against the action of said flails.

6. A ballistic separator comprising a container, a shaft rotatably mounted in said container about a substantially vertical axis, means for rotating said shaft about said axis, rigid flails mounted for rotation with said shaft about said axis effective to propel heavy and resilient objects outwardly, deflector means effective to deflect said objects upwardly out of said container, means for causing a downdraft of air through said container effective to pull lighter and less resilient material downwardly against the action of said flails and a hammer mill positioned below said flails effective to receive and pulverize said lighter and less resilient material.

7. The separator specified in claim 6, wherein said hammer mill is mounted on said shaft.

8. The separator specified in claim 7 and including a cylindrical drum surrounding said hammer mill.

9. The separator specified in claim 6 wherein said hammer mill includes means to cause a downdraft of air.

10. A ballistic separator comprising a container, a shaft rotatably mounted in said container about a substantially vertical axis, means for rotating said shaft about said axis, rigid flails mounted pivotally on said shaft for rotation therewith and to be swingable relative thereto, said flails being effective to propel heavy and resilient objects outwardly, deflector means effective to deflect said objects upwardly out of said container and means for causing a downdraft through said container effective to pull lighter and less resilient material downwardly against the action of said flails.

References Cited by the Examiner

UNITED STATES PATENTS

| | | | |
|---|---|---|---|
| 1,756,253 | 4/30 | Lykken | 241—188 X |
| 2,082,419 | 6/37 | Rietz | 241—86 |
| 2,333,246 | 11/43 | Harris. | |
| 3,090,073 | 5/63 | Toti | 146—50.1 X |

ROBERT C. RIORDON, *Primary Examiner.*

J. SPENCER OVERHOLSER, *Examiner.*